United States Patent [19]

Brungardt

[11] Patent Number: 5,714,025
[45] Date of Patent: Feb. 3, 1998

[54] PROCESS FOR FORMING A CERAMIC BODY

[75] Inventor: Clement Linus Brungardt, Oxford, Pa.

[73] Assignee: Lanxide Technology Company, LP, Newark, Del.

[21] Appl. No.: 481,980

[22] Filed: Jun. 7, 1995

Related U.S. Application Data

[63] Continuation of Ser. No. 284,912, Aug. 3, 1994, abandoned, which is a continuation of Ser. No. 71,633, Jun. 1, 1993, abandoned, which is a continuation of Ser. No. 699,535, May 14, 1991, abandoned, which is a division of Ser. No. 417,627, Oct. 5, 1989, abandoned.

[51] Int. Cl.$^6$ ............................................. C04B 37/00
[52] U.S. Cl. ............................ 156/89; 264/624; 264/640; 264/641
[58] Field of Search ........................... 264/44, 59, 60, 264/63, 603, 624, 640, 641; 156/77, 89; 427/181, 190, 215, 228, 243, 376.1, 387

[56] References Cited

U.S. PATENT DOCUMENTS

| | | | |
|---|---|---|---|
| 3,510,394 | 5/1970 | Cadotte | 162/145 |
| 3,899,555 | 8/1975 | Takao et al. | 264/44 |
| 4,255,316 | 3/1981 | Blizzard | 260/37 |
| 4,372,814 | 2/1983 | Johnstone et al. | 162/124 |
| 4,379,109 | 4/1983 | Simpson | 264/60 |
| 4,421,599 | 12/1983 | Kuzuoka et al. | 162/100 |
| 4,487,657 | 12/1984 | Gomez | 162/158 |
| 4,488,969 | 12/1984 | Hou | 210/679 |
| 4,510,019 | 4/1985 | Bartelloni | 162/141 |
| 4,521,355 | 6/1985 | Kitajima et al. | 264/60 |
| 4,529,662 | 7/1985 | Lancaster et al. | 428/450 |
| 4,578,150 | 3/1986 | Hou | 162/164.3 |
| 4,608,361 | 8/1986 | Kanamori et al. | 502/232 |
| 4,609,431 | 9/1986 | Grose et al. | 162/135 |
| 4,642,271 | 2/1987 | Rice | 428/698 |
| 4,718,926 | 1/1988 | Nakamoto et al. | 55/523 |
| 4,885,265 | 12/1989 | Hillig et al. | 501/95 |
| 4,943,349 | 7/1990 | Gomez | 162/158 |
| 4,946,643 | 8/1990 | Dunmead et al. | 419/12 |
| 5,009,822 | 4/1991 | Sack et al. | 264/60 |
| 5,030,702 | 7/1991 | Vaahs et al. | 264/60 |

FOREIGN PATENT DOCUMENTS

| | | |
|---|---|---|
| 97974 | 1/1984 | European Pat. Off. |
| 261820 | 3/1988 | European Pat. Off. |
| 59-018175 | 1/1984 | Japan. |
| 61-168582 | 7/1986 | Japan. |
| 61-239100 | 10/1986 | Japan. |
| 62-207778 | 9/1987 | Japan. |
| 01055235 | 3/1989 | Japan. |

*Primary Examiner*—Christopher A. Fiorilla

[57] ABSTRACT

A ceramic-forming prepreg tape is prepared by (a) dispersing in water a ceramic-forming powder and a fiber, (b) flocculating the dispersion by adding a cationic wet strength resin and an anionic polymer, (c) dewatering the flocculated dispersion to form a sheet, (d) wet pressing and drying the sheet, and (e) coating or impregnating the sheet with an adhesive selected from the group consisting of a polymeric ceramic precursor, and a dispersion of an organic binder and the materials used to form the sheet. The tape can be used to form laminates, which are then fired to consolidate the tapes to a ceramic.

18 Claims, No Drawings

PROCESS FOR FORMING A CERAMIC BODY

This is a continuation of application Ser. No. 08/284,912 filed on Aug. 3, 1994, and now abandoned, which is a continuation of U.S. Ser. No. 08/071,633, filed on Jun. 1, 1993, and now abandoned, which is a continuation of U.S. Ser. No. 07/699,535, filed on May 14, 1991, and now abandoned, which is a divisional of U.S. Ser. No. 07/417,727, filed Oct. 5, 1989, and now abandoned.

FIELD OF THE INVENTION

This invention relates to a process for forming an inorganic sheet material. This invention especially relates to a wet forming process for making a coated or impregnated ceramic-forming prepreg tape.

BACKGROUND OF THE INVENTION

In general, the traditional methods used to shape ceramics, such as slip-casting, tape-casting and hot-pressing, are slow and labor-intensive, and the green bodies that are formed by these methods are often fragile and difficult to handle. Although papermaking methods have been proposed for shaping ceramic powders, e.g., U.S. Pat. Nos. 3,510,394; 3,899,555; 4,421,599; 4,521,355 and 4,529,662, these methods have several disadvantages. It is difficult to form dense ceramics by these methods since the amount of fibrous material needed to form a strong sheet on a continuous paper machine limits the density of the resulting ceramic green body and in turn, the density of the fired ceramic. The mechanical strength of the fired ceramic is usually directly related to the ceramic's density, i.e., dense ceramics are generally stronger than porous ceramics. In addition, the preparation of a highly filled paper sheet is limited to the use of ceramic-forming powders that yield strong green bodies. For example, an inorganic sheet filled with silicon nitride or silicon carbide disintegrates to powder as the wood pulp burns out during firing. Moreover, some of the prior art ceramic sheet materials are difficult to prepare in a continuous process, some are difficult to handle because they lack strength in the wet state, most are not flexible enough to be wound into shapes such as multi-layer tubes, and none are tacky and drapeable.

SUMMARY OF THE INVENTION

A method has now been found for rapidly forming highly filled, homogeneous, ceramic-forming prepreg tapes that are strong, drapeable and tacky. The process of this invention for preparing a ceramic-forming prepreg tape comprises (a) dispersing in water a ceramic-forming powder and a fiber, (b) flocculating the dispersion by adding a cationic wet strength resin and an anionic polymer, (c) dewatering the flocculated dispersion to form a sheet, (d) wet pressing and drying the sheet and (e) coating or impregnating the sheet with an adhesive selected from the group consisting of a ceramic precursor, and a dispersion of an organic binder and the materials used to form the sheet. The tape can be used to form laminates, which are then fired to consolidate the tapes to a ceramic.

DETAILED DESCRIPTION OF THE INVENTION

The first step of the process according to this invention is the dispersion in water of an inorganic powder and a fiber. Examples of suitable fibers include, but are not limited to, wood pulp, polyolefin pulp, carbon fiber, glass fiber and alumina fiber. A mixture of fibers can also be used. The desired end use of the product will determine whether inorganic or organic fibers are selected. For example, an inorganic fiber is used when a ceramic with increased fracture toughness is desired. An organic fiber, which is subsequently burned out, is used if a porous material is desired, e.g., for filtration applications. When making a porous ceramic, any organic filler commonly used in the ceramics art for making porous materials, e.g., walnut shell flour or sawdust, can be used in addition to the fiber.

Any type of ceramic-forming powder can be used in the process of this invention, e.g., clays, oxide ceramics, and non-oxide ceramics. Although the ceramic materials are referred to as "powders" throughout this specification, it should be understood that these materials can also be in the form of whiskers and platelets. When a dense ceramic product is desired, a sintering aid can be added to the starting mixture. The sintering aid used will depend upon which ceramic-forming powder is employed to make the tape. For example, alumina and yttria are typically used as sintering aids for silicon nitride powder, while CaO, MgO and $SiO_2$ are typically used with alumina powder.

The type and amount of fiber used depends upon the desired end use of the product. When using inorganic fibers, the mount used is determined by the degree of reinforcement desired in the end product. For example, a minimum of 20–30% by weight inorganic fiber is typically used for making a reinforced ceramic composite. When using organic fibers, the porosity of the product increases with the amount of fiber used. If the product is to be used as a filter, enough organic material must be added to form a continuous network of pores after the material is burned out, typically at least 20% by weight organic fiber or at least 35–40% by Volume of organic filler.

After the fiber and inorganic powder are dispersed in water, the dispersion is flocced by adding a cationic wet strength resin and an anionic polymer. Examples of suitable cationic wet strength resins include KYMENE® 2064, KYMENE® 557H, KYMENE® 367, KYMENE® 450 and KYMENE® 460 amine-epichlorohydrin resins, which are commercially available from Hercules Incorporated. The cationic resins provide wet strength during sheet formation, particularly when using a continuous papermaking process, and during the subsequent coating or impregnating step. Suitable anionic polymer flocculating agents include, but are not limited to, RETEN® 523P and RETEN® 235 polyacrylamide resins, both manufactured by Hercules Incorporated, and carboxymethyl cellulose. The order of addition of the cationic and anionic polymers is not critical, although the cationic polymer is generally added first.

The flocculated dispersion is dewatered to form a sheet in which the fibers and inorganic powder are uniformly dispersed, and the sheet is wet pressed and dried. The sheet can optionally be calendered after drying.

After the drying step the sheet is coated or impregnated with an adhesive that can be a polymeric ceramic precursor, or a dispersion of an organic binder and the materials from which the sheet is formed. Suitable polymeric ceramic precursors include, but are not limited to, polysiloxanes, polycarbosilanes, and polysilazanes. The polymeric ceramic precursor can be used with or without a solvent, depending upon its viscosity. When a solution of a preceramic polymer is used as an impregnant, the tapes are dried to evaporate the solvent, although the surface remains tacky. An adhesive comprising a dispersion of an organic binder and the materials used to form the sheet is typically used when making porous sheets, and is generally applied by coating. Suitable organic binders include, but are not limited to, starch and poly(vinyl alcohol)-based commercial adhesives. The adhesive containing the organic binder can include the organic filler, if one is used, but generally does not contain the fiber used to form the sheet. Tapes coated with an adhesive containing an organic binder are preferably stored in such a manner that the water or solvent does not evaporate.

The green tapes of this invention can be formed by a continuous papermaking process and are typically stronger and more flexible than green bodies formed by prior art methods, particularly when wet. The coated or impregnated tapes can be stored in the unfired state and can subsequently be stacked or wound to build up multilayer, three dimensional shapes such as laminates, tubes and honeycombs. Because of their tacky surface, they can be used to form multilayer structures without a separate step for applying an adhesive. Since a significant amount of the adhesive is also converted to a ceramic, a denser product is obtained than would be possible without the use of the adhesive. When forming laminates, the composition of the tapes used to form the layers can be the same or different. After stacking, the layers are pressed, with or without heating, and fired to consolidate the material to a ceramic by standard methods. Ceramics formed by this method can be used to prepare capacitors, heat-exchangers, filters, and catalyst supports.

EXAMPLE 1

A dispersion is prepared by mixing 48 g of walnut shell flour, 145.5 g of an alumina dispersion (69% solids in water), 640 g of a wood pulp dispersion (2.5% solids, white hardwood bleached kraft), and sufficient water to dilute the mixture to 16 liters. After transferring a 2 liter portion of this dispersion to a glass jar and a second dilution to 3 liters, the dispersion is flocced by first adding 6 ml of a solution of KYMENE® 2064 cationic synthetic resin (Hercules Incorporated) (3.75% solids in water), followed by 95 g of an aqueous solution of RETEN® 235 anionic synthetic resin supplied by Hercules Incorporated (0.125% solids) until the supernatant becomes clear and a cottony floc is formed. An 8"×8" sheet is formed from the flocced dispersion on a Noble and Wood handsheet machine. A 100 mesh stainless steel papermaking screen is used to form the sheet. The drainage of the sheet is rapid (approximately 10 seconds), and paper formation is good. The sheet is then wet pressed and dried. Five additional handsheets are formed from the dispersion using an identical procedure. Calculations based on the weight of the sheet show that retention of the alumina and the organic filler is greater than 95%.

Six squares of the alumina paper (2.5"×2.5") are soaked in a solution consisting of 79% polydimethylsiloxane (7.5% vinyl-methyl copolymer supplied by Petrarch Systems, Inc.), 1% dicumyl peroxide, and 20% 1,1,1-trichloroethane. The squares are then air dried for 24 hours to remove the solvent. Once dried, a six layer laminate is stacked and pressed by hand.

The laminate is pressed at 1,000 p.s.i. (150° C.) for one hour on a Carver Laboratory Press to cure the siloxane polymer. One-sixteenth inch shims are used to control the thickness of the pressed laminates. Curing is continued without pressure in a 125° C. oven for an additional 16 hours.

The dried laminate is fired in air according to the schedule shown below.

60° C./hour, room temperature to 200° C.
10° C./hour, 200° C. to 400° C.
60° C./hour, 400° C. to 800° C.
120° C./hour, 800° C. to 1400° C.
Hold at 1400° C. for 4 hours
Cool to room temperature A ceramic body having a density of 1.72 g/cc is formed from the laminate.

EXAMPLE 2

Silicon nitride (37.67 g), 1.67 g of yttrium oxide, 0.83 g of alumina and 0.125 g of sodium tripolyphosphate are dispersed in 500 ml of distilled water using a Waring Blendor. After transferring the dispersion to a 1 gallon (3.8 liters) jar, 10.00 g of wood pulp are added as a dilute dispersion in distilled water (approximately 2.5% solids). Distilled water is added to raise the solution level to 3 liters. The dispersion is flocced by first adding unactivated KYMENE® 2064 cationic synthetic resin supplied by Hercules Incorporated (6.48 g of a 19.3% solids solution) to the dispersion, followed by adding an aqueous solution of carboxymethyl cellulose (CMC) type 7-H, supplied by The Aqualon Group (1.0% solids) until the supernatant becomes clear. Typically, 79.2 g of the CMC solution are required. Three 8"×8" sheets are formed from 1000 ml aliquots of this dispersion on a Noble and Wood handsheet machine. A 100 mesh stainless steel papermaking screen is used. The drainage of water from the flocced dispersion is rapid (14 seconds). Paper formation is good. Each sheet is then wet pressed and dried. Calculations based on the weight of the paper show greater than 95% inorganic powder retention.

Each sheet of silicon nitride paper is pressed at 6,000 psi using a Carver Laboratory Press. The pressed samples are then cut into 1"×3" strips.

Poly(methylvinyl)silazane to be used as the adhesive for the prepreg tape is prepared as follows. A 5 liter, three-necked flask is equipped with an overhead mechanical stirrer, a dry ice/acetone condenser (−78° C.), an ammonia/nitrogen inlet tube and a thermometer. The apparatus is sparged with nitrogen and then charged with hexane (1760 ml, dried over 4 A molecular sieves), methyldichlorosilane (209 ml, 230.9 g, 2.0 mol) and vinylmethyldichlorosilane (64 ml, 69.6 g, 0.5 mol). The ammonia is added at a rate of 3.5 l/min (9.37 mol) for one hour. During the addition, the temperature of the reaction rises from 25° C. to 69° C. After one hour, the ammonia flow is stopped and the reaction mixture cooled to room temperature. The reaction mixture is filtered on a glass-fritted funnel to remove the precipitated ammonium chloride. The hexane is removed from the filtrate under reduced pressure (28 mmHg, 60° C.) to give $(CH_3SiHNH)_{0.8}(CH_3SiCH=CH_2NH)_{0.2}$ as a clear oil (150.76 g, 2.34 mol, 94% yield). The oil has a viscosity of 43 cps at 25° C. and a molecular weight of 560 g/mol.

Ten silicon nitride strips are impregnated by soaking for 1 hour in a solution of the poly(methylvinyl) silazane containing 1% dicumyl peroxide. Excess polysilazane is wiped off and the strips are stacked and pressed by hand.

The silicon nitride laminate is pressed at 2,500 psi, 160° C. for 10 minutes on a Carver Lab Press to cure the polysilazane. One-eighth inch shims are used to control the thickness of the pressed laminate.

The laminate is fired according to the schedule listed below.

60° C./hour, room temperature to 500° C., in air
120° C./hour, 500° C. to 1500° C., in nitrogen
Hold at 1500° C. for 2 hours Cool to room temperature A solid, dark-blue ceramic with a density of 1.53 g/cc is formed.

EXAMPLE 3

Cordierite paper is prepared as follows. A dispersion is prepared by mixing 36.2 g of talc, 36.88 g of kaolin clay, 4.51 g of alumina powder, and 0.25 g of sodium tripolyphosphate in 500 ml of distilled water using a Waring Blendor. After transferring the clay dispersion to a 1 gallon (3.8 liters) jar, 22.38 g of wood pulp are added as a dilute dispersion in distilled water (2.5% solids). The dispersion is then diluted to 3 liters with distilled water and flocced by first adding 2.5 g of unactivated KYMENE® 2064 cationic synthetic resin supplied by Hercules Incorporated (26.15 g of a 9.56% solids aqueous solution), followed by an aqueous solution of carboxymethyl cellulose (CMC), type 7H, supplied by The Aqualon Group until the supernatant becomes clear. Typically, 80 g of CMC solution are required. A total of six 8"×8" sheets are formed from 500 ml aliquots of the flocced dispersion on a Noble and Woods handsheet machine. A 100 mesh stainless steel papermaking screen is used to form the sheet. The drainage of the sheet is rapid (approximately 10 seconds), and the paper formation is good. Each sheet is then wet pressed and dried. Calculations based on the weight of the sheet show that retention of the inorganic powders is greater than 95%. The dried cordierite paper is calendered on both sides at 1250 pounds per linear inch (p.l.i.) using a Perkins calender. Each calendered sheet is then cut into 1"×3" strips for lamination.

A laminate is formed from ten 1"×3" strips of calendered cordierite sheet that have been coated on both sides with a dispersion consisting of 95.0 g of a 10% aqueous starch solution and 90.5 g of the mixture of talc, clay and alumina used to prepare the cordierite sheet. The strips are stacked, pressed by hand, and dried for 30 minutes at 125° C. The laminate is then pressed at 6,000 p.s.i. for 2 minutes on a Carver Laboratory Press, and dried for 48 hours at 125° C.

The dried cordierite laminate is fired in air according to the schedule shown below.

60° C./hour, room temperature to 800° C.

120° C./hour, 800° to 1300° C.

Sold at 1300° C. for 4 hours

Cool to room temperature

A porous ceramic with a density of 1.3 g/cc is formed.

EXAMPLE 4

A porcelain sheet is prepared as follows. A dispersion is prepared by mixing 28.03 g of feldspar, 23.88 g of kaolin clay, 26.17 g of alumina, and 0.25 g of sodium tripolyphosphate in 500 ml of distilled water using a Waring Blendor. After transferring the clay dispersion to a 1 gallon (3.8 liters) jar, 21.91 g of wood pulp are added as a dilute dispersion in distilled water (2.5% solids). The dispersion is then diluted to 3 liters with distilled water and flocced by first adding 2.5 g of unactivated KYMENE® 2064 cationic synthetic resin supplied by Hercules Incorporated (26.15 g of a 9.56% solids aqueous solution), followed by an aqueous solution of carboxymethyl cellulose (CMC) type 7H, supplied by The Aqualon Group, until the supernatant becomes clear. Typically, 80 g of CMC solution are required. A total of six 8"×8" sheets are formed from 500 ml aliquots of the flocced dispersion on a Noble and Woods handsheet machine. A 100 mesh stainless steel papermaking screen is used to form the sheet. The drainage of the sheet is rapid (approximately 20 seconds), and paper formation is good. Each sheet is then wet pressed and dried. Calculations based on the weight of the sheet show that retention of inorganic powders is greater than 95%.

A laminate is formed from ten 1"×3" strips of calendered porcelain sheet that have been coated on both sides with a dispersion consisting of 95.0 g of a 10% aqueous starch solution and 90.5 g of the mixture of feldspar, clay, and alumina used to prepare the porcelain sheet. The strips are stacked, pressed by hand, and dried for 30 minutes at 125° C. The laminate is then pressed at 6,000 p.s.i. for 2 minutes on a Carver Laboratory Press, and dried for 48 hours at 125° C.

The dried porcelain laminate is fired in air according to the schedule shown below.

60° C./hour, room temperature to 800° C.

120° C./hour, 800° C. to 1300° C.

Hold at 1300° C. for 4 hours

Cool to room temperature

A solid ceramic with a density of 2.4 g/cc is formed.

EXAMPLE 5

An alumina dispersion is prepared by milling a 50% solids slurry of alumina and water in a vibratory mill. Alumina cylinders are used as the grinding medium. Sodium tripolyphosphate (0.25% based on alumina solids) is used as the dispersant. The milled dispersion (170 g) and 600 g of a wood pulp dispersion (2.5% solids) are mixed in a 1 gallon (3.8 liters) jar. The dispersion is then diluted to 3 liters with distilled water and flocced by first adding 2.5 g of unactivated KYMENE® 2064 cationic synthetic resin supplied by Hercules Incorporated (26.15 g of a 9.56% solids aqueous solution), followed by an aqueous solution of carboxymethyl cellulose type 7H supplied by The Aqualon Group (1.0% solids) until the supernatant becomes clear. Typically, 200 g of CMC solution are required. Four 6"×6" sheets are formed from 500 ml aliquots of the flocced dispersion on a Noble and Woods handsheet machine. A 100 mesh stainless steel papermaking screen is used to form the sheet. The drainage of the sheet is rapid (approximately 20 seconds), and paper formation is good. The sheets are then wet pressed and dried. Calculations based on the weight of the sheet show that alumina retention is greater than 95%.

A cylinder is formed by wrapping a sheet of the inorganic paper that has been coated on both sides with adhesive around a paper mandrel. The adhesive is a dispersion of 95.0 g of a 10% aqueous starch solution and 95.5 g of the alumina used to form the sheet. Three additional sheets are added to increase the thickness of the cylinder. The cylinder is then dried in an oven overnight.

EXAMPLE 6

A dispersion is prepared by mixing 32 g of walnut shell flour, 145.5 g of alumina dispersion (69% solids in water), 640 g of a wood pulp dispersion (2.5% solids, white hardwood bleached kraft), and sufficient water to dilute the mixture to 16 liters. After transferring a 2 liter portion of this dispersion to a glass jar and a second dilution to 3 liters, the dispersion is flocced by first adding 6 ml of a solution of KYMENE® 2064 cationic synthetic resin supplied by Hercules Incorporated (3.75% solids in water), followed by 90 g of an aqueous solution of RETEN® 235 artionic synthetic resin supplied by Hercules Incorporated (0.1257% solids) until the supernatant becomes clear and a cottony floc is formed. An 8"×8" sheet is then formed from the flocced dispersion on a Noble and Wood handsheet machine. A 100 mesh stainless steel papermaking screen is used to form the sheet. The drainage of the sheet is rapid (approximately 10 seconds), and paper formation is good. The sheet is then wet pressed and dried. Seven additional handsheets are formed from the dispersion using an identical procedure. Calculations based on the weight of the sheet show that retention of alumina and the organic filler is greater than 95%.

A laminate is formed from eight 2.5"×2.5" squares of alumina sheet that have been coated on both sides with a dispersion consisting of 20.0 g of a commercial polyvinyl alcohol-based adhesive (Elmer's GLUE-ALL), 20 g of walnut shell flour, and 90.0 g of the alumina dispersion used to prepare the sheet. The squares are stacked, pressed by hand, and dried for 30 minutes at 125° C. The laminate is then pressed at 6,000 p.s.i. for 2 minutes on a Carver Laboratory Press, and dried for 48 hours at 125° C.

The dried alumina laminate is fired in air according to the schedule shown below.

60° C./hour, room temperature to 200° C.

5° C./hour, 200° C. to 250° C.

30° C./hour, 250° C. to 300° C.

5° C./hour, 300° C. to 375° C.

60° C./hour, 375° C. to 1600° C.

Hold at 1600° C. for 4 hours

Cool to room temperature

A porous ceramic with a density of 1.56 g/cc is formed.

EXAMPLE 7

A handsheet is prepared from a dispersion of the materials listed below using the procedure described in
Example 5

6.0 g chopped alumina fiber (⅛", supplied by Du Pont)

34.0 g alumina powder 0.10 g sodium tripolyphosphate

KYMENE® 2064 cationic synthetic resin (1.0 g) supplied by Hercules Incorporated (5.18 g of a 19.3% solids solution) and 75.0 g of an aqueous solution of carboxymethyl cellulose type 7H supplied by The Aqualon Group (1.0% solids) are used to floc the dispersion. The sheet is strong and well-formed. Retention of alumina powder is approximately 95%.

A laminate is formed from twelve 1×3" strips of the alumina/alumina fiber sheet that have been coated on both sides with a dispersion consisting of 95.0 g of a 10% aqueous starch solution and 90.5 g of the alumina used to prepare the sheet. The strips are stacked, pressed by hand, and dried for 30 minutes at 95° C. The laminate is then pressed at 6,000 p.s.i. for 2 minutes on a Carver Laboratory Press, and dried for 48 hours at 125° C.

The dried alumina laminate is fired in air according to the schedule shown below.

60° C./hour, room temperature to 800° C.

120° C./hour, 800° C. to 1600° C.

Hold at 1600° C. for 4 hours

Cool to room temperature

A solid ceramic with a density of 2.7 g/cc is formed.

What I claim and desire to protect by Letters Patent is:

1. A process for preparing a ceramic body comprising stacking, winding or shaping drapeable, tacky, ceramic-forming prepreg tape, and firing said drapeable, tacky, ceramic-forming prepreg tape to consolidate the drapeable, tacky, ceramic-forming prepreg tape to a ceramic, said drapeable, tacky, ceramic-forming prepreg tape comprising a mixture of at least one non-fibrous, ceramic-forming powder and at least one inorganic fiber, and being coated or impregnated with an adhesive selected from the group consisting of a polymeric ceramic precursor, and a dispersion of an organic binder and the at least one non-fibrous, ceramic-forming powder used to form the drapeable, tacky, ceramic-forming prepreg tape.

2. The process of claim 1, wherein the polymeric ceramic precursor comprises a polysiloxane, a polysilazane or a polycarbosilane.

3. The process of claim 1, wherein the drapeable, tacky, ceramic-forming prepreg tape further comprises organic fiber.

4. The process of claim 3, wherein said organic fiber is added to the adhesive dispersion of the organic binder and the at least one non-fibrous, ceramic-forming powder.

5. The process of claim 3, wherein the at least one non-fibrous, ceramic-forming powder comprises alumina and the at least one organic fiber comprises wood pulp.

6. The process of claim 1, wherein the at least one non-fibrous, ceramic-forming powder comprises a mixture of talc, kaolin clay and alumina.

7. The process of claim 1, wherein the at least one non-fibrous, ceramic-forming powder comprises a mixture of feldspar, kaolin clay and alumina.

8. The process of claim 1, wherein said ceramic body comprises at least one form selected from the group consisting of capacitors, heat-exchangers, filters, and catalyst supports.

9. A process for preparing a ceramic body comprising (1) stacking a multiplicity of layers of a drapeable, tacky, ceramic-forming prepreg tape to form a laminate, (2) pressing the laminate, and (3) firing the laminate to consolidate the multiplicity of layers of the drapeable, tacky, ceramic-forming prepreg tape to a ceramic body, said drapeable, tacky, ceramic-forming prepreg tape comprising a mixture of at least one non-fibrous, ceramic-forming powder and at least one inorganic fiber, and being coated or impregnated with an adhesive selected from the group consisting of a polymeric ceramic precursor, and a dispersion of an organic binder and the at least one non-fibrous, ceramic-forming powder used to form the drapeable, tacky, ceramic-forming prepreg tape.

10. The process of claim 9, wherein the polymeric ceramic precursor comprises a polysiloxane, a polysilazane or a polycarbosilane.

11. The process of claim 9, wherein said drapeable, tacky, ceramic-forming prepreg tape further comprises organic fiber.

12. The process of claim 11, wherein the at least one non-fibrous, ceramic-forming powder comprises alumina and the at least one organic fiber comprises wood pulp.

13. The process of claim 9, wherein the at least one non-fibrous, ceramic-forming powder comprises a mixture of feldspar, kaolin clay and alumina.

14. The process of claim 9, wherein the at least one non-fibrous, ceramic-forming powder comprises a mixture of talc, kaolin clay and alumina.

15. A process for preparing a porous ceramic body comprising (1) stacking a multiplicity of layers of a drapeable, tacky, ceramic-forming prepreg tape to form a laminate, (2) pressing the laminate, and (3) firing the laminate to consolidate the multiplicity of layers of the drapeable, tacky, ceramic-forming prepreg tape to a porous ceramic body, said drapeable, tacky, ceramic-forming prepreg tape comprising a mixture of at least one non-fibrous, ceramic-forming powder, organic fiber, and organic filler, and being coated or impregnated with an adhesive selected from the group consisting of a polymeric ceramic precursor, and a dispersion of an organic binder and the at least one non-fibrous, ceramic-forming powder used to form the drapeable, tacky, ceramic-forming prepreg tape.

16. The process of claim 15, wherein the polymeric ceramic precursor comprises a polysiloxane, a polysilazane or a polycarbosilane.

17. A process for preparing a ceramic body comprising shaping, winding, stacking or laminating drapeable, tacky ceramic-forming prepreg tape, and firing the drapeable, tacky, ceramic-forming prepreg tape to consolidate the drapeable, tacky, ceramic-forming prepreg tape to a ceramic body, said drapeable, tacky, ceramic-forming prepreg tape comprising a mixture of at least one non-fibrous, ceramic-forming powder and at least one organic fiber, and being coated or impregnated with adhesive selected from the group consisting of a polysiloxane, a polysilazane, a polycarbosilane, and a dispersion of organic binder and the at least one non-fibrous, ceramic-forming powder used to form the drapeable, tacky, ceramic-forming prepreg tape.

18. The process of claim 17, further comprising at least one inorganic fiber.

* * * * *